United States Patent [19]

Trombly

[11] 4,031,449
[45] June 21, 1977

[54] ELECTROMAGNETICALLY COUPLED BATTERY CHARGER

[75] Inventor: John E. Trombly, Winchester, Mass.

[73] Assignee: Arthur D. Little, Inc., Cambridge, Mass.

[22] Filed: Nov. 20, 1975

[21] Appl. No.: 633,987

[52] U.S. Cl. .................................. 320/2; 320/23; 320/39; 320/59; 336/211

[51] Int. Cl.² .......................................... H02J 7/04

[58] Field of Search .................................... 320/2–5, 320/20–24, 39, 40, 59, 43; 336/211, 229; 323/45

[56] References Cited

UNITED STATES PATENTS

| | | | |
|---|---|---|---|
| 2,502,398 | 3/1950 | Yenni | 320/39 |
| 3,188,562 | 6/1965 | Kusters et al. | 336/211 X |
| 3,280,363 | 10/1966 | Powell | 323/45 X |
| 3,641,336 | 2/1972 | Boin | 320/2 X |
| 3,736,480 | 5/1973 | Lee | 320/59 X |
| 3,885,211 | 5/1975 | Gutai | 320/2 |

Primary Examiner—Robert J. Hickey
Attorney, Agent, or Firm—Weingarten, Maxham & Schurgin

[57] ABSTRACT

A solid state electronic battery charger which is electromagnetically coupled to one or more batteries. A charging circuit energizes a drive winding to produce an alternating field received by an associated coupler and operative to convey charging current to a battery connected thereto. A sense winding monitors the level of the alternating field to derive a signal representative of the battery charge level and which causes a tapered charge to be supplied to the battery and an indication of a sensed fully charged state. A proximity sensor can be provided to denote the presence of a coupled battery and by which charging operation is commenced.

14 Claims, 5 Drawing Figures

ELECTROMAGNETICALLY COUPLED BATTERY CHARGER

FIELD OF THE INVENTION

This invention relates to battery chargers and more particularly to chargers electromagnetically coupled to a battery for the charging thereof.

BACKGROUND OF THE INVENTION

Electrical battery chargers are well known for the charging of storage batteries. Most chargers are adapted for direct electrical connection to the terminals of a battery to be charged, however, for many applications electrical contacts are a disadvantage. For example, in a miner's cap lamp, the battery pack is conventionally charged by means of an electrical connector fitted to the lamp assembly or battery pack. The connector must have low resistance contacts in order to maintain a consistent, reliable, charging capability. Contamination of the contacts or the corrosion thereof caused by coal dust or other contaminating environment can markedly decrease the efficiency of the electrical contacts with corresponding decrease in the efficiency of battery charging. Moreover, the accessibility of battery contacts or terminals can be a serious problem in explosive environments, as in a coal mine, since short circuiting or tampering with the contacts can produce a spark with possibly disastrous consequences.

Battery chargers have been developed in which electrical contacts are eliminated and electromagnetic coupling employed to convey energy from the charger to a battery. Many such electromagnetically coupled chargers are so-called trickle chargers by which a battery is charged over a relatively long period of time with a small current which continues to flow for so long as the battery is coupled to the charger. These trickle type chargers are usually employed for low energy batteries employed in small battery operated appliances and provide no means for varying the charge or for determining when a fully charged state is reached. This type of charger is shown, for example, in U.S. Pat. Nos. 3,148,552; 3,675,108 and 3,840,795. Another charger is shown in U.S. Pat. No. 3,641,336 in which a battery and charging circuit are contained within a lamp housing and connectable to an external power supply by means of a transformer having a primary winding incorporated into a removable external head and a secondary winding in the lamp housing. A reed switch is connected in series with the primary winding to energize the winding only upon coupling of the two transformer windings for operation.

SUMMARY OF THE INVENTION

In brief, the present invention provides a solid state electronic battery charger which is electromagnetically coupled to one or more batteries to be charged and capable of producing a tapered charge and an indication of a sensed fully charged condition. A charging circuit energizes a drive winding which produces an alternating field which is received by a coupler connected to a battery being charged and by which charging current is supplied to the battery. A sense winding continuously monitors the alternating field and is associated with a control circuit providing a signal representative of battery charge level and operative to adjust the level of charging current in accordance therewith and to indicate a fully charged battery condition. A proximity sensor can be provided to denote the presence of a coupled battery and by which charging operation is commenced. The novel charger provides relatively high power charging which diminishes or tapers in accordance with the sensed battery charge to achieve efficient charging without damage to the battery.

In a preferred embodiment, coupling is provided by an electromagnetic assembly which includes a drive winding for conveying power to an associated battery coupler, a sense winding for monitoring the energizing field and a proximity winding for detecting the presence of a battery. The coupler connected to the battery is adapted to be disposed in electromagnetic coupling relationship with the charger and to be retained in such coupling relationship during a charging interval. The invention is especially adapted for use with a battery powered miner's cap lamp wherein the battery pack includes a coupling assembly disposed in operative association with the charging circuit coupling assembly. No electrical terminals are required by the novel charger or the battery, thereby substantially eliminating the opportunity for sparking or short circuiting. The absence of electrical terminals also eliminates problems of contact corrosion.

DESCRIPTION OF THE DRAWINGS

The invention will be more fully understood from the following detailed description taken in conjunction with the accompanying drawings, in which.

DETAILED DESCRIPTION OF THE INVENTION

Figure 1:
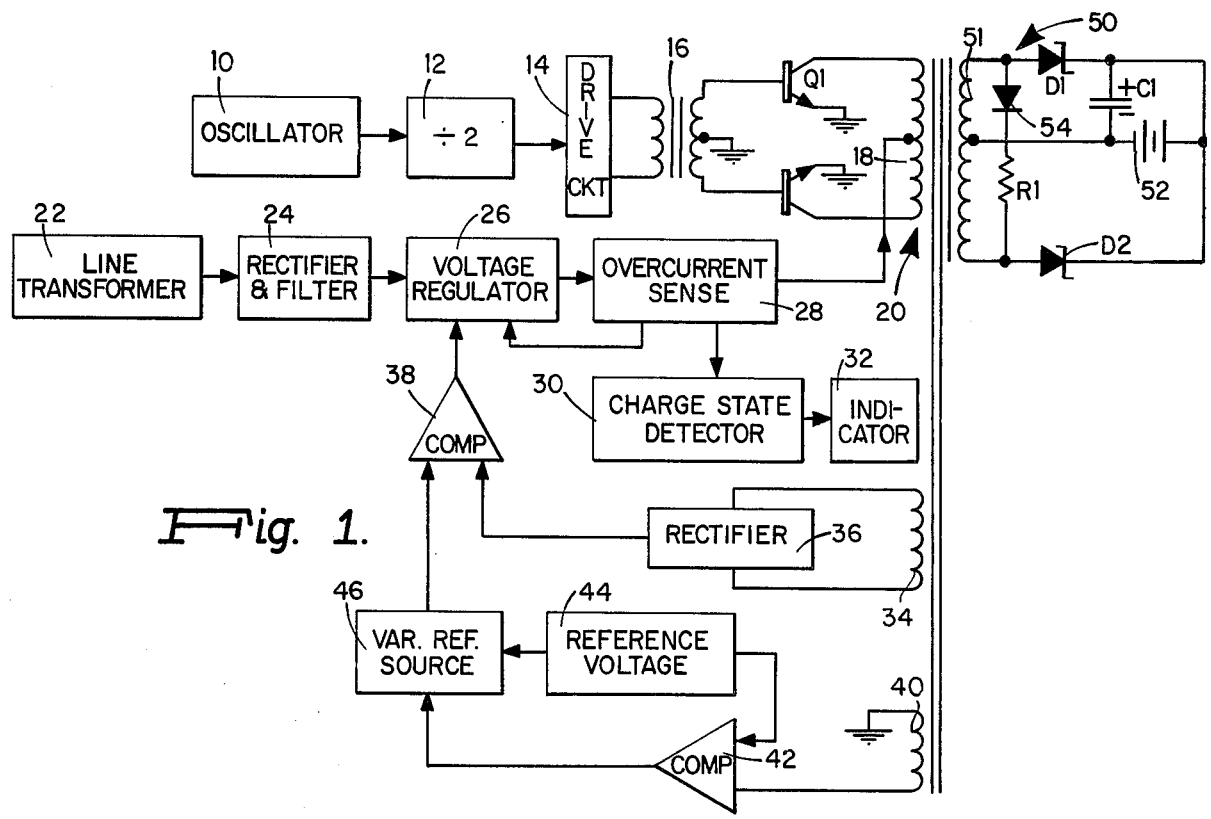
FIG. 1 is a diagrammatic representation of a battery charger according to the invention.

Referring to FIG. 1, there is shown a battery charger embodying the invention and by which high energy charging of a battery can be accomplished in a relatively efficient and safe manner. An oscillator 10, typically operative at a frequency of 40KHz is coupled to a divider circuit 12 which provides an output signal half the frequency of that of oscillator 10, this output signal being applied to a drive circuit 14 coupled to the primary winding of a drive transformer 16. The secondary winding of transformer 16 is coupled to respective transistors Q1 and Q2, the center tap of the transformer secondary winding being coupled to ground or other reference potential. The collectors of transistors Q1 and Q2 are respectively coupled to opposite ends of a drive winding 18 of an electromagnetic assembly 20. The emitters of transistors Q1 and Q2 are coupled to ground. Power from an AC source is provided by a line transformer 22 to a rectifier and filter 24 which provides a square wave signal to voltage regulator 26 which, in turn, is coupled to an overcurrent sense circuit 28. One output of circuit 28 is coupled to a center tap of drive winding 18. Circuit 28 also provides a feedback signal to voltage regulator 26 and an output signal to a charge state detector 30 operative to energize an indicator 32 such as a light emitting diode. A field sense winding 34 of electromagnetic assembly 20 is coupled to a rectifier 36, the output of which is applied to one input of a comparator 38. The comparator 38 provides a signal to voltage regulator 26 to control the output level thereof. A proximity sense winding 40 of assembly 20 is coupled to one input of a comparator 42, the other input of which is provided by a reference voltage source 44. Source 44 and comparator 42 are coupled to an adjustable reference source 46, the output of which is applied to an input of comparator 38.

An electromagnetic receiver assembly 50 is adapted for coupling to assembly 20 for receipt of charging power provided by drive winding 18. The winding 51 of assembly 50 is connected to a battery 52 to be charged in the manner shown in FIG. 1. The receiver winding is coupled via respective Schottky diodes D1 and D2, poled as shown, to the positive terminal of battery 52. The negative terminal of battery 52 is connected to the center tap of winding 51, and a capacitor C1 is connected to shunt with battery 52. A light emitting diode 54 or other suitable indicator is connected across the receiver winding in series with a current limiting resistor R1. With winding 51 in coupling relationship with winding 18, current is supplied to battery 52, the charging level being controllable in accordance with the charge condition of the battery such that a tapered charge is delivered to the battery until a fully charged state is sensed, at which time the fully charged battery state is indicated.

In operation, the transistors Q1 and Q2 are alternately conductive in response to the square wave signal provided by drive circuit 14 and transformer 16 to cause the switching of current through drive winding 18 thereby to provide an alternating (AC) magnetic field. The magnetic field intensity is sensed by winding 34 which provides a signal which is rectified to provide a direct current signal which is compared by comparator 38 with a reference potential provided by source 46. Comparator 38 provides an error voltage proportional to the difference between the signal derived from field sense winding 34 and the reference voltage from source 46, this error voltage being employed to control voltage regulator 26 which determines the magnitude of current supplied to drive winding 18 and thus the magnitude of the charging field. The charging field is of a magnitude in accordance with the sensed charge condition of the battery such that a tapered charge is supplied which diminishes as the battery charge reaches a fully charged level. At the fully charged condition, the charging field is of minimum level to produce a trickle charge to the battery. The output current of voltage regulator 26 is monitored by sense circuit 28 which is in feedback connection with regulator 26 to limit the maximum current that may be supplied to the load. The voltage regulator is thus protected from excess power dissipation that can occur by reason of a defective or short circuited battery.

The sense circuit 28 also provides a signal to detector 30 which is operative to energize indicator 32 for denoting the charge state. Indicator 32 typically is a light emitting diode which is illuminated while charging is in process and extinguished upon a fully charged state being reached. The light emitting diode 54 or other suitable indicator connected to receiver winding 51 is energized upon coupling of assemblies 20 and 50 to denote proper coupling for the conveyance of charging power to battery 52. The absence of an indication by light emitting diode 54 denotes lack of proper coupling between assemblies 20 and 50 and which would prevent proper charging of battery 52. Other indicators of well known type can be employed to denote the coupled or uncoupled condition of the charger or to denote the charging state.

The charger operates in a quiescent mode when the magnetic assembly 20 is uncoupled from the assembly 50. Upon coupling of the magnetic assemblies, the altered flux field pattern is detected by winding 40 which provides a signal to comparator 42 which is operative to peak detect the signal from winding 40 and to provide a control signal for source 46 to control the reference voltage level thereof. With the magnetic assemblies in coupling relationship, the reference voltage provided by source 46 is at a maximum predetermined level. With the battery removed from the charger, thus uncoupling the magnetic assemblies 20 and 50, the reference voltage from source 46 is attenuated by a predetermined amount to cause a corresponding reduction in current provided by comparator 38 to regulator 26, and which, in turn, limits the current supplied to winding 18. During the quiescent mode, sufficient current is provided to magnetic assembly 20 to maintain its detection capability for sensing of a coupled load. During quiescent operation, however, current is at extremely low level, typically less than 30 milliamperes, which corresponds to a quiescent power dissipation of less than 100 milliwatts.

Figure 2:
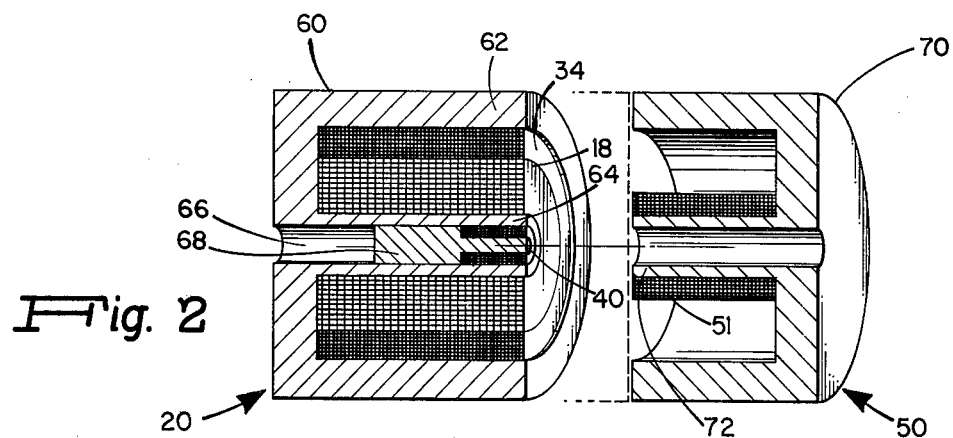
FIG. 2 is a sectional pictorial view of the electromagnetic coupling assemblies in a preferred embodiment.

The magnetic assemblies 20 and 50 are preferably constructed on a high permeability core to permit efficient power generation and transfer. A preferred implementation is shown in FIG. 2 which can provide power transfer of about 10 watts over a gap between assemblies of up to 0.1 inch. The assembly 20 includes a ferrite core 60 of cup shaped configuration having an outer annular wall 62 and a coaxially disposed inner cylindrical projection 64. An annular space is defined between wall 62 and projection 64, while a cylindrical opening 66 is provided coaxially through projection 64. The drive winding 18 is provided around projection 64 and is of bifilar wound form. The field sense winding 34 is coaxially disposed around winding 18 and is of single wound configuration. The proximity sense winding 40 is disposed on a ferrite core 68 inserted within opening 66, with the forward end of winding 40 being flush with the forward surface of core 60. The receiver assembly 50 includes a ferrite core 70 similar to core 60 and having a bifilar winding 51 provided around central projection 72 and in magnetic coupling arrangement with respect to winding 18 of assembly 20 when the assemblies 20 and 50 are in operative disposition.

In the illustrated embodiment, the assembly windings are constructed as follows for a switching frequency of 20KHz and a power level of about 10 watts:

| Winding 18 | — | 2 × 30 turns<br>No. 20 enameled wire |
|---|---|---|
| Winding 34 | — | 10 turns<br>No. 30 enameled wire |
| Winding 40 | — | 20 turns<br>No. 28 enameled wire |
| Winding 51 | — | 2 × 10 turns<br>No. 20 enameled wire |

With assembly 50 uncoupled from assembly 20, the field provided by winding 18 diverges to the annular face of wall 62 of core 60. This diverging field is sensed by winding 40 which is disposed in the fringing field to provide a signal indication of the absense of coupling.

When the assemblies 20 and 50 are closely coupled, as shown in dotted outline in FIG. 2, the reluctance of the magnetic path is markedly decreased and the field pattern tends to align with the mating surfaces of cores 60 and 70. The plane of the field in this coupled condition is substantially orthogonal to the face of core 60 and no significant fringing field is detectable by winding 40. This winding 40 in the coupled condition thus provides a signal indicative of coupling by the assemblies 20 and 50.

Figure 3:
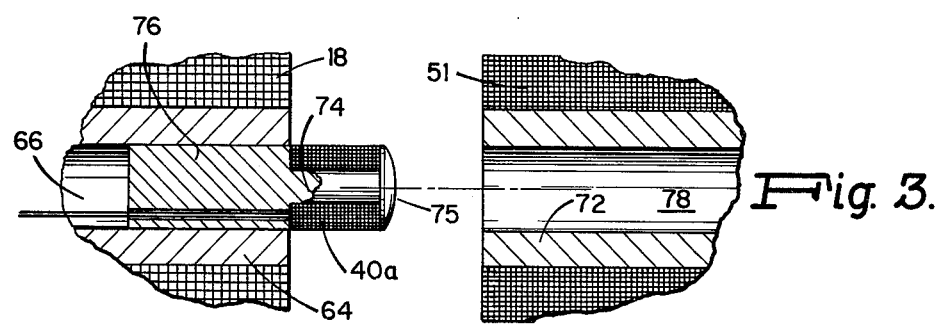
FIG. 3 is a cutaway sectional elevational view of an alternative embodiment of the assemblies of FIG. 2.

The proximity sense winding can be alternatively embodied as shown in FIG. 3. A winding 40a is provided on a plastic or other insulative stud 74 outwardly extending from the face of core 60 and having an enlarged portion 76 retained within opening 66 of core 60. Stud 74 can include an end flange 75 for retention of winding 40a. During coupling of assemblies 20 and 50, winding 40a is disposed within opening 78 of core 70 and senses no appreciable fringing field. When assembly 20 is uncoupled from assembly 50, the fringing field is sensed by winding 40a to denote the uncoupled state. As an alternative, proximity of assembly 50 in association with assembly 20 can be effected by other than electromagnetic elements. For example, a reed switch or other switch component can be employed to detect coupled proximity in order to control reference source 46 and the corresponding charging state.

Figure 4:
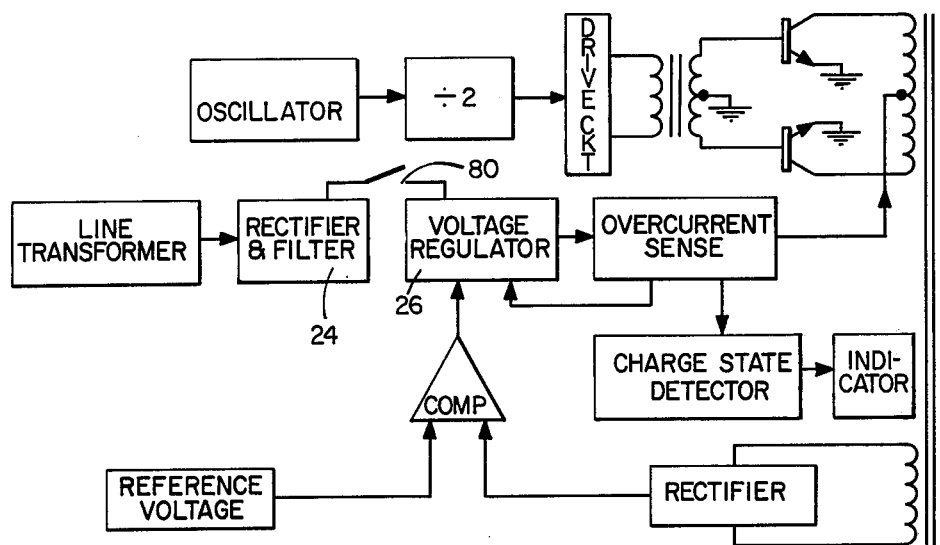
FIG. 4 is a diagrammatic representation of an alternative embodiment of the charger of FIG. 1.

An alternative embodiment of the invention is shown in FIG. 4 which is similar to the embodiment of FIG. 1 but not including proximity sense winding 40, comparator 42 and variable reference source 46. In this embodiment of FIG. 4, a switch 80 is provided to selectively couple rectifier and filter 24 to voltage regulator 26. This switch is preferably actuated upon the disposition of assemblies 20 and 50 in electromagnetic coupling relationship such that charging power is provided to drive winding 18 only in the presence of a battery to be charged. With assembly 50 decoupled from assembly 20, switch 80 is open and no charging power is supplied to winding 18. If desired, the opening of switch 80 can also de-energize the entire charging circuit.

Figure 5:
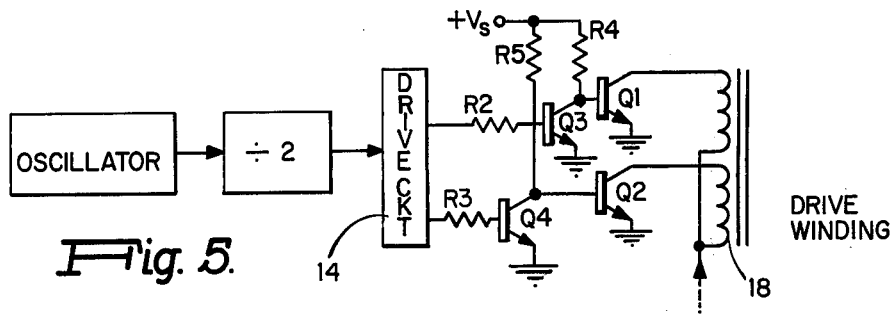
FIG. 5 is a diagrammatic representation of a further embodiment of the invention.

A modification of the embodiments of FIGS. 1 and 4 is shown in FIG. 5 wherein the transformer 16 is replaced with transistors Q3 and Q4 for energizing drive winding 18 via transistors Q1 and Q2. The drive circuit 14 is connected via resistors R2 and R3 and resistors R4 and R5 to the respective bases of transistors Q3 and Q4, the collectors of which are coupled to the respective bases of transistors Q1 and Q2. This modification provides less efficient power conversion than the embodiments of FIGS. 1 and 4 but is of lower cost by reason of elimination of the driving transformer.

The charging circuitry can be implemented in any convenient form to provide an intended packaging arrangement and can be of either discrete or integrated circuit form to suit performance and cost requirements. In the event that a plurality of batteries are to be charged in parallel, the novel charger can be embodied in a manner to share portions of the operating circuitry. In the embodiment of FIG. 1, for example, oscillator 10, driver 12, driver circuit 14, transformer 22 and rectifier and filter 24 can be employed in common for driving of a plurality of chargers, each associated with a respective electromagnetically coupled battery.

It will be appreciated that the specific implementation of the invention can vary in accordance with intended operating requirements. Accordingly, it is not intended to limit the invention by what has been particularly shown and described except as indicated in the appended claims.

What is claimed is:

1. A battery charger comprising:
    a first electromagnetic assembly having a drive winding and a sense winding;
    a charging circuit operative to energize said drive winding to provide a predetermined alternating field;
    a control circuit connected to said sense winding and to said charging circuit and operative in response to a signal from said sense winding to control the charging level of said charging circuit;
    an electromagnetic receiver assembly connectable to a battery to be charged and adapted for electromagnetic coupling to said assembly; and
    means operative in response to the presence of said receiver assembly in coupling relationship with said first assembly to enable full power operation of said charging circuitry, including:
    a proximity winding operative to provide a signal upon coupling of said receiver assembly and said first assembly; and
    means operative in response to said proximity winding signal to provide an enabling signal to cause full power operation of said charging circuit.

2. The battery charger of claim 1 wherein said charging circuit includes:
    means for providing a charging current to said drive winding;
    means for switching said current through said drive winding to provide said predetermined alternating field;
    and wherein said control circuit includes:
    means for providing an error signal representative of the magnitude of the signal from said sense winding; and
    means for applying said error signal to said current providing means to control the magnitude of said charging current.

3. The battery charger of claim 1 wherein said charging circuit includes:
    means operative in response to an AC source to provide a rectified and filtered signal;
    voltage regulator means receiving said rectified and filtered signal and providing an output signal of predetermined magnitude to said drive winding; and
    means for switching said output signal through said drive winding to provide said predetermined alternating field.

4. The battery charger of claim 3 further including:
    current sensing means in feedback connection with said voltage regulator means to limit the maximum current supplied to said drive winding; and
    means for indicating the operating state of said charger.

5. The battery charger of claim 4 wherein said control circuit includes:
    rectifier means connected to said sense winding and operative to provide a signal representative of the magnitude of said alternating field; and
    comparator means operative in response to said signal from said rectifier means to provide an error signal to said voltage regulator means for controlling the magnitude of current applied to said drive winding.

6. The battery charger of claim 1 wherein said first electromagnetic assembly includes:
a magnetic core having said drive winding and sense winding each disposed thereon;
said drive winding providing said alternating field from a predetermined face of said core, and said sense winding being disposed to sense said alternating field.

7. A battery charger comprising:
a first electromagnetic assembly having a drive winding and a sense winding;
a charging circuit operative to energize said drive winding to provide a predetermined alternating field, including:
  means operative in response to an AC source to provide a rectified and filtered signal;
  voltage regulator means receiving said rectified and filtered signal and providing an output signal of predetermined magnitude to said drive winding; and
  means for switching said output signal through said drive winding to provide said predetermined alternating field;
a control circuit connected to said sense winding and to said charging circuit and operative in response to a signal from said sense winding to control the charging level of said charging circuit, including:
  rectifier means connected to said sense winding and operative to provide a signal representative of the magnitude of said alternating field; and
  comparator means operative in response to said signal from said rectifier means to provide an error signal to said voltage regulator means for controlling the magnitude of current applied to said drive winding;
current sensing means in feedback connection with said voltage regulator means to limit the maximum current supplied to said drive winding;
means for indicating the operating state of said charger;
an electromagnetic receiver assembly connectable to a battery to be charged and adapted for electromagnetic coupling to said first assembly; and
means operative in response to the presence of said receiver assembly in coupling relationship with said first assembly to enable full power operation of said charging circuitry, including:
  a proximity sensor operative to detect the presence of said receiver assembly in coupling relationship with said first assembly to provide a signal indication thereof; and
  means operative in response to said signal indication to control the magnitude of said error signal in accordance with the coupled condition of said receiver assembly and first assembly.

8. The battery charger of claim 7 wherein said proximity sensor is an electromagnetic proximity sense winding operative to sense the presence of said receiver assembly and first assembly in coupling relationship.

9. For use in a battery charger electromagnetically coupled to a battery and including means for providing an alternating field by which charging current is supplied to said battery, and means for sensing said alternating field to control the magnitude of said charging current in accordance with the level of charge of said battery, an electromagnetic assembly comprising:
a high permeability magnetic core having an outer annular wall and a coaxial cylindrical portion defining an annular space therebetween, said annular wall and cylindrical portion terminating in an end face;
a drive winding coaxially disposed within said annular space about said cylindrical portion and providing in response to an energizing signal an alternating field emanating from said end face; and
a sense winding coaxially disposed in said annular space in association with said drive winding and operative to provide a signal representative of the magnitude of said alternating field.

10. The invention of claim 9 further including:
a proximity sense winding disposed in said cylindrical portion of said core and operative to sense the fringing field of said drive winding in the absence of a receiver assembly coupled to said core.

11. The invention of claim 9 further including:
a proximity sense winding coaxially disposed with respect to said drive and sense windings and outwardly extending from said end face and operative to sense the fringing field of said drive winding in the absence of a receiver assembly coupled to said core.

12. A battery charger comprising:
a first electromagnetic assembly having a drive winding and a sense winding, including:
  a magnetic core having said drive winding and sense winding each disposed thereon;
  said drive winding providing said alternating field from a predetermined face of said core, and said sense winding being disposed to sense said alternating field;
a charging circuit operative to energize said drive winding to provide a predetermined alternating field;
a control circuit connected to said sense winding and to said charging circuit and operative in response to a signal from said sense winding to control the charging level of said charging circuit;
a electromagnetic receiver assembly connectable to a battery to be charged and adapted for electromagnetic coupling to said assembly; and
means operative in response to the presence of said receiver assembly in coupling relationship with said first assembly to enable full power operation of said charging circuitry, including:
  a proximity sense winding disposed with respect to said core to sense the fringing field of said drive winding in the absence of coupling between said receiver assembly and first assembly.

13. For use in a battery charger electromagnetically coupled to a battery and including means for providing an alternating field by which charging current is supplied to said battery, and means for sensing said alternating field to control the magnitude of said charging current in accordance with the level of charge of said battery, an electromagnetic assembly comprising:
a high permeability magnetic core having an outer annular wall and a coaxial cylindrical portion defining an annular space therebetween, said annular wall and cylindrical portion terminating in an end face;
a drive winding coaxially disposed within said annular space about said cylindrical portion and providing in response to an energizing signal an alternating field emanating from said end face;
a sense winding coaxially disposed in said annular space in association with said drive winding and operative to provide a signal representative of the magnitude of said alternating field; and a proximity sense winding coaxially disposed with respect to said drive and sense winding and outwardly extending from said end face and operative to sense the fringing field of said drive winding in the absence of a receiver assembly coupled to said core.

14. A battery charging comprising:

a first electromagnetic assembly having a drive winding disposed on a magnetic core;

a charging circuit operative to energize said drive winding to provide a predetermined alternating field;

an electromagnetic receiver assembly connectable to a battery to be charged and adapted for electromagnetic coupling to said first assembly; and means operative in response to the presence of said receiver assembly in coupling relationship with said first assembly to enable full power operation of said charging circuitry, including:

a proximity winding disposed with respect to said core to sense the fringing field of said drive winding in the absence of coupling between said receiver assembly and first assembly and operative to provide a signal upon coupling of said receiver assembly and said first assembly; and means operative in response to said proximity winding signal to provide an enabling signal to allow full power operation of said charging circuit.

* * * * *